United States Patent
Lien

(10) Patent No.: US 8,286,928 B2
(45) Date of Patent: *Oct. 16, 2012

(54) WALL HOOK

(76) Inventor: Chin-Hsiung Lien, El Monte, CA (US)

( * ) Notice: Subject to any disclaimer, the term of this patent is extended or adjusted under 35 U.S.C. 154(b) by 137 days.

This patent is subject to a terminal disclaimer.

(21) Appl. No.: 12/798,722

(22) Filed: Apr. 9, 2010

(65) Prior Publication Data

US 2010/0200708 A1   Aug. 12, 2010

Related U.S. Application Data

(63) Continuation-in-part of application No. 11/888,026, filed on Jul. 30, 2007.

(51) Int. Cl.
*A47H 1/16* (2006.01)

(52) U.S. Cl. ...... 248/303; 248/71; 411/400; 211/106.01

(58) Field of Classification Search ............... 248/690, 248/691, 692, 304, 301, 303, 339

See application file for complete search history.

(56) References Cited

U.S. PATENT DOCUMENTS

| 934,255 | A * | 9/1909 | Wilson | 248/218.2 |
| 6,364,266 | B1 * | 4/2002 | Garvin | 248/303 |
| 7,726,619 | B2 * | 6/2010 | Lien | 248/303 |

* cited by examiner

*Primary Examiner* — Amy Sterling
*Assistant Examiner* — Erin W Smith
(74) *Attorney, Agent, or Firm* — Raymond Y. Chan; David and Raymond Patent Firm

(57) ABSTRACT

A wall hook includes an inserting head and a levering handle. The inserting head has a front penetrating tip and a rear fulcrum end. The levering handle includes a cable holder and a fastening enhancer. The cable holder is transversely and integrally extended from the inserting head, wherein the cable holder defines a receiving cavity and an access opening communicating with the receiving cavity for allowing a user to dispose at least one cable in the receiving cavity via the access opening. On the other hand, the fastening enhancer is transversely and inclinedly extended from the inserting head in such a manner that when the inserting head is rotatably inserted on the wall surface, the fastening enhancer is arranged to be rotated until the fastening enhancer basis against the wall surface for restricting a further axial displacement of the wall hook while providing an enhanced torque applying structure.

22 Claims, 8 Drawing Sheets ately larger

WALL HOOK

CROSS REFERENCE OF RELATED APPLICATION

This is a Continuation-In-Part application that claims the benefit of priority under 35 U.S.C. §119 to a non-provisional application having an application number of Ser. No. 11/888,026, and a filing date of Jul. 30, 2007.

BACKGROUND OF THE PRESENT INVENTION

1. Field of Invention

The present invention relates to a wall hook, and more particularly to a wall hook, wherein the wall hook comprises an inserting head and a transverse arm transversely extending therefrom for increasing the torque distance to minimize a torque required to directly apply at the inserting head.

2. Description of Related Arts

A wall hook is considered as one of the common wall accessories to hold an item on the wall. Generally speaking, there are two types of wall hook in the existing market. The first type of wall hook is a wall hanger adapted for mounting on a flat wall surface to hang the item, such as cloth or picture frame, on the wall. Accordingly, such wall hanger, which is a one-piece hanging device, generally comprises a pin head having a screwing axis and a hanging hook rearwardly extended from the pine head along the screwing axis, such that when the user drives the hanging hook to rotate with respect to the screwing axis by his or her hand in a tool-less manner, the pin head is rotated to insert into the wall. However, such wall hanger has a major drawback that the user must apply a relatively large rotational force at the hanging hook in order to force the pin head to penetrate through the wall surface. It is worth to mention that when the pin head is driven to penetrate through the wall surface along the screwing axis by the rotational force, the pin head will be unintentionally forced in a radial direction. In other words, the mounting hole formed by the insertion of the pin head will be bigger than the circumferential size of the pin head. Since the wall hanger is used as a hanging device to hang the item on the wall, the deformation of the mounting hole will weaken the retention force along the pin head so as to reduce the hanging ability of the wall hanger.

In order to solve the above mentioned problem, an improved wall hanger comprises a wall base affixing to the wall surface by a screw and a hanger body mounted to the wall base such that the hanger body is adapted to substantially support the item on the wall. However, the improved wall hanger requires a tool, such as a screw driver, to install the wall base on the wall and involves different components, i.e. the wall base, the hanger body, and the screw, which will complicate the overall structural configuration and will significantly increase the manufacturing cost of the wall hanger. Thus, the size of the improved wall hanger is relatively larger than the conventional one-piece wall hanger such that the user will not use the improved wall hanger for hanging the picture frame on the wall.

Another type of wall hook is a cable clip for mounting on the flat wall surface to hold the cable on the wall. Accordingly, the cable clip, which is a one-piece holding device having the similar structure of the wall hanger, comprises a pin head having a screwing axis and a clip hook rearwardly extended from the pine head along the screwing axis. When the user drives the clip hook to rotate with respect to the screwing axis by his or her hand in a tool-less manner, the pin head is rotated to insert into the wall, such that the cable can be held at the clip hook. As it is mentioned above, once the user applies the relatively large rotational force at the clip hook to force the pin head to penetrate through the wall surface, the mounting hole will be deformed. In addition, the clip hook having a C shape cannot securely hold the cable in position. It is a hassle for the user to place the cable within the clip hook if the size of the opening of the clip hook is reduced to prevent the cable accidentally detaching therefrom. On the other hand, the cable will be easily detached from the clip hook if the size of the opening of the clip hook is enlarged.

As a result, no matter which type of the wall hook is used, the wall surface will be damaged by the deformation of the mounting hole. It is worth to mention that when the wall hook is used for supporting a relatively heavy item, the deformation of the mounting hole will be getting more serious. In other words, if the user is able to use his or her hand to install the pin head into the wall to form a prefect mounting hole, the wall hook is adapted to maximize the hanging ability by distributing the force to the wall through the surrounding surface of the mounting hole and to minimize the damage of the wall.

SUMMARY OF THE PRESENT INVENTION

The invention is advantageous in that it provides a wall hook, wherein the wall hook is adapted for increasing the torque distance so as to minimize a torque required to directly apply at the inserting head.

Another advantage of the invention is to provide a wall hook, wherein the wall hook comprises a levering handle extending from the inserting head to prolong the torque such that the user is able to penetrate the inserting head by rotating the levering handle with respect to the rotational axis so as to minimize the deformation of the mounting hole.

Another advantage of the invention is to provide a wall hook, wherein the user is able to easily mount the wall hook to the wall by less rotational force in a tool-less manner. In other words, the user can use his or her hand to mount the wall hook without any screw driver or the like Another advantage of the invention is to provide a wall hook, wherein the wall hook can be configured as a wall hanger to suspendedly hang an item on the wall or a cable clip to hold the cable on the wall.

Another advantage of the invention is to provide a wall hook, wherein the opening of the cable cavity is formed at a slant manner when the wall hook is used as a cable clip such that the cable must be intentionally slid at two sequencing directions, i.e. the slant direction and the horizontal direction in order to hold the cable within the cable cavity. In other words, the user is able to easily place the cable within the cable cavity without any difficulty. Once the cable is disposed at the cable cavity of the wall hook, the cable is securely held to prevent the cable from being accidentally detached from the wall hook of the present invention.

Another advantage of the invention is to provide a wall hook, which provides a simple one-piece structure so as to minimize the manufacturing cost of the wall hook.

Another advantage of the invention is to provide a wall hook, wherein no expensive or complicated structure is required to employ in the present invention in order to achieve the above mentioned objects. Therefore, the present invention successfully provides an economic and efficient solution not only for providing a rigid configuration but also for supporting the item on the wall or the like and for minimize the force to mount the wall hook on the wall.

Additional advantages and features of the invention will become apparent from the description which follows, and may be realized by means of the instrumentalities and combinations particular point out in the appended claims.

According to the present invention, the foregoing and other objects and advantages are attained by providing a wall hook for mounting on a wall surface, which comprises:

an inserting head having a front penetrating tip for being rotatably inserted into a wall surface and a rear fulcrum end integrally and rearwardly extended from the penetrating tip; and a levering handle which comprises a cable holder transversely and integrally extended from the inserting head, wherein the cable holder defines a receiving cavity and an access opening communicating with the receiving cavity for allowing a user to dispose at least one cable in the receiving cavity via the access opening; and a fastening enhancer transversely and inclinedly extended from the inserting head in such a manner that when the inserting head is rotatably inserted on the wall surface, the fastening enhancer is arranged to be rotated as well until the fastening enhancer basis against the wall surface for restricting a further axial displacement of the wall hook while providing an enhanced torque applying arrangement for rotatably inserting the wall hook onto the wall surface.

These and other objectives, features, and advantages of the present invention will become apparent from the following detailed description, the accompanying drawings, and the appended claims.

DETAILED DESCRIPTION OF THE PREFERRED EMBODIMENT

Figure 1:
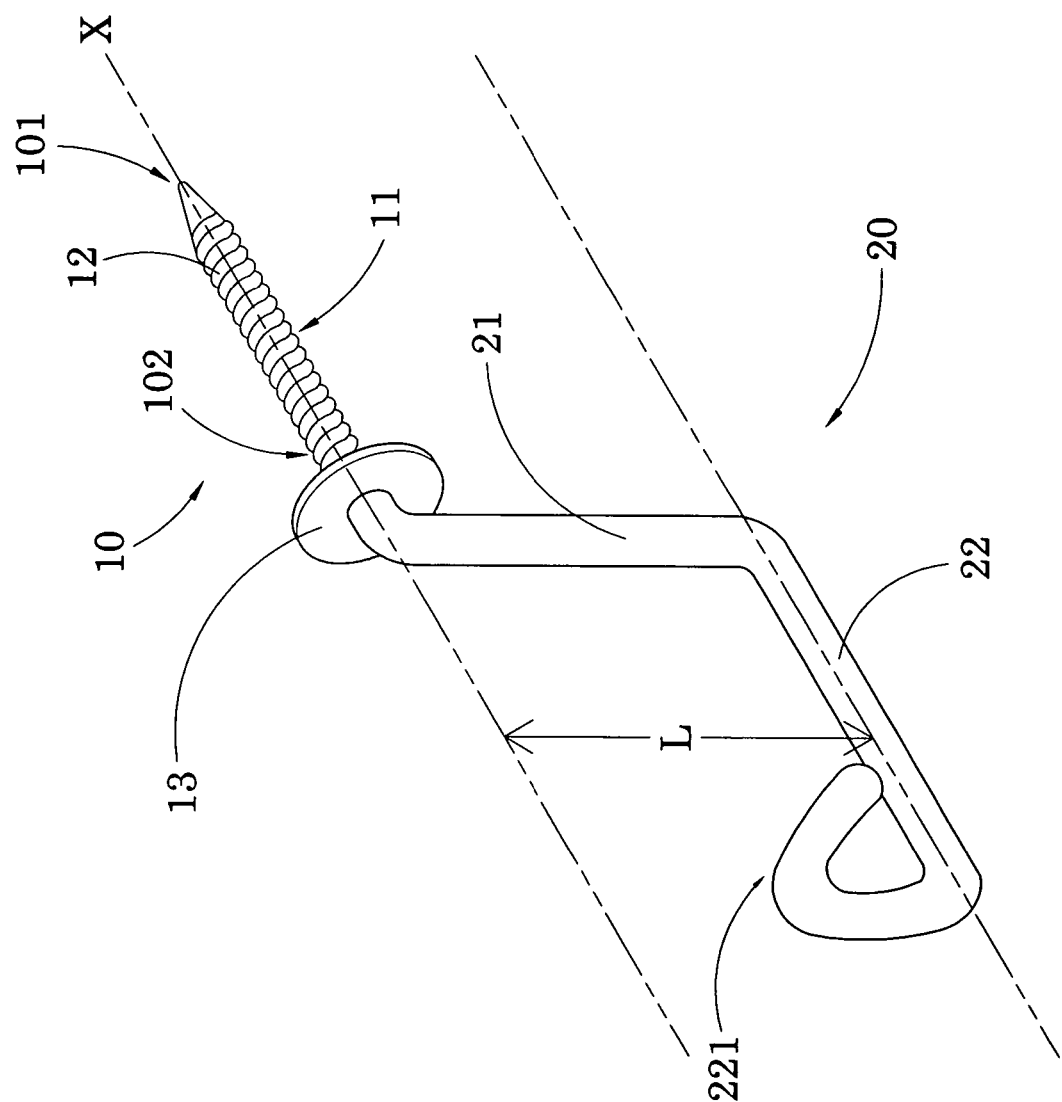
FIG. 1 is a perspective view of a wall hook according to a first preferred embodiment of the present invention.

Referring to FIG. 1 of the drawing, a wall hook for mounting on a wall W or the like according to a first preferred embodiment of the present invention is illustrated, wherein the wall hook, which is adapted for mounting on a wall W, especially for a dry wall, comprises an inserting head 10 and a levering handle 20.

Figure 2:
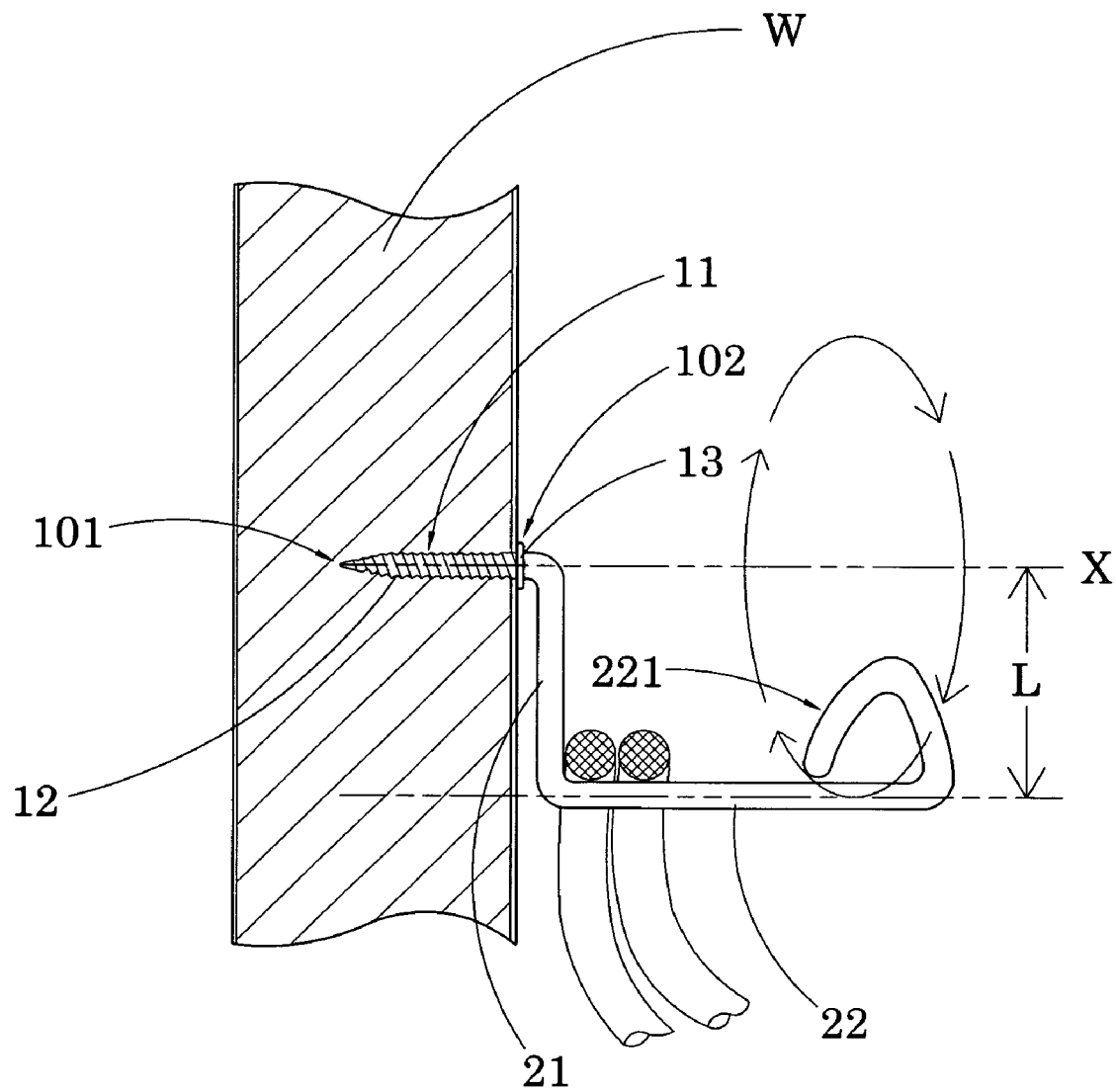
FIG. 2 is a side view of the wall hook according to the above first preferred embodiment of the present invention, illustrating the wall hook fixing on the wall.

As shown in FIGS. 1 and 2, the inserting head 10, which defines a rotational axis X, has a front penetrating tip 101 adapted for rotatably inserting into a wall surface of the wall W and a rear fulcrum end 102 rearwardly extended from the penetrating tip 101 along the rotational axis X. Accordingly, in order to perpendicularly insert the inserting head 10 into the wall surface of the wall W, the inserting head 10 must be driven to rotate with respect to the rotational axis X to form a mounting hole on the wall W.

The inserting head 10 comprises an elongated inserting body 11 having a predetermined length for inserting into the wall W, and has a spiral thread 12 provided on an outer circumferential surface of the inserting body 11, wherein the spiral thread 12 is extended from the penetrating tip 101 to the fulcrum end 102 for the inserting head 10 rotatably penetrating into the wall W.

Accordingly, the inserting head 10 further comprises a wall stopper 13 integrally and outwardly protruded at the fulcrum end 102 and arranged in such a manner that the inserting head 10 is adapted for rotatably penetrating into the wall W until the wall stopper 13 is biased against the wall surface.

The levering handle 20 comprises a transverse arm 21 integrally and transversely extended from the fulcrum end 102 of the inserting head 10 to substantially prolong a torque distance L along the transverse arm 21 with respect to the rotational axis X, and a controlling arm 22 integrally extended from the transverse arm 21 in such a manner that when the levering handle 20 is rotated, the inserting head 10 is driven to rotate for rotatably penetrating into the wall W so as to minimize a torque required to directly apply at the inserting head 10.

As shown in FIG. 2, the transverse arm 21 is integrally extended from the fulcrum end 102 of the inserting head 10 at 90°. In other words, the transverse arm 21 is integrally extended from the inserting head 10 at a right angle to form a L-shaped structure. It is worth to mention that the torque distance L is defined as the distance between the inserting head 10 and the controlling arm 22. Therefore, when the transverse arm 21 is extended from the inserting head 10 at a right angle, the torque distance L is defined as the length of the transverse arm 21. In other words, when the transverse arm 21 is perpendicularly extended from the inserting head 10, the torque distance L of the wall hook of the present invention can be maximized. Mathematically, the torque is determined by the distance and the rotational force. Therefore, when the torque distance is increased, the rotational force will be substantially reduced to produce the same amount of torque. Therefore, the user requires relatively less rotational force to produce same amount of torque as the conventional wall hook in order to insert the inserting head 10 into the wall W.

According to the first embodiment, the controlling arm 22 is integrally extended from the transverse arm 21 and is extended parallel to the rotational axis X such that when the controlling arm 22 is rotated around the rotational axis X, the inserting head 10 is driven to rotate through the transverse arm 21. Accordingly, the controlling arm 22 is preferably extended from the transverse arm 21 paralleling to the rotational axis X. Therefore, when the controlling arm 22 is driven to rotate around the rotational axis X, the rotational movement of the controlling arm 22 can be effectively transformed as a rotational force to drive the inserting head 10 to rotatably insert into the wall W.

As shown in FIG. 2, the controlling arm 22 is extended 90° from the transverse arm 21 to form a L-shaped structure. In other words, the transverse arm 21 is perpendicularly extended between the inserting head 10 and the controlling arm 22 such that the controlling arm 22 is parallel to the inserting head 10. Having the unique structural configuration, the controlling arm 22 is adapted for supporting an article along the controlling arm 22 so as to suspendedly hang the article on the wall W when the inserting head 10 is inserted into the wall W. When the inserting head 10 is perpendicularly inserted into the wall surface of the wall W, the controlling arm 22 is perpendicularly protruded out from the wall surface of the wall W such that the article is adapted to be hung at the controlling arm 22 to suspendedly hang on the wall W as shown in FIG. 2. In other words, the controlling arm 22 not only forms a hand crank to drive the inserting head 10 to rotatably insert into the wall W but also provides a hanger to suspendedly hang the article on the wall W.

In order to securely hang the article at the wall W through the controlling arm 22, the controlling arm 22 has a free end portion bent in a loop structure to form a rounded obstructing end 221 for retaining the article along the controlling arm 22 between the transverse arm 21 and the obstructing end 221 of the controlling arm 22. Accordingly, the obstructing end 221 of the controlling arm 22 forms a stopping end to block the article from being slid out of the controlling arm 22 at the obstructing end 221 thereof.

According to the first embodiment, the user is able to mount the article, such as cloth or picture frame, on the wall surface of the wall W via the wall hook of the present invention. The user is able to mount the wall hook at the wall W by rotating the controlling arm 22 of the levering handle 20 to drive the inserting head 10 into the wall W. Since the controlling arm 22 is located away from the inserting head 10 with the torque distance L via the length of the transverse arm 21, the user is able to easily drive the inserting head 10 to rotatably insert into the wall W with relatively less rotational force. Thus, the inserting head 10 can be precisely inserted into the wall W along the rotational axis X to form the mounting hole matching with the circumferential size of the inserting head 10 not only for maximizing the hanging ability of the wall hook in responsive to the mounting hole but also for minimizing the damage of the wall W.

Figure 3:
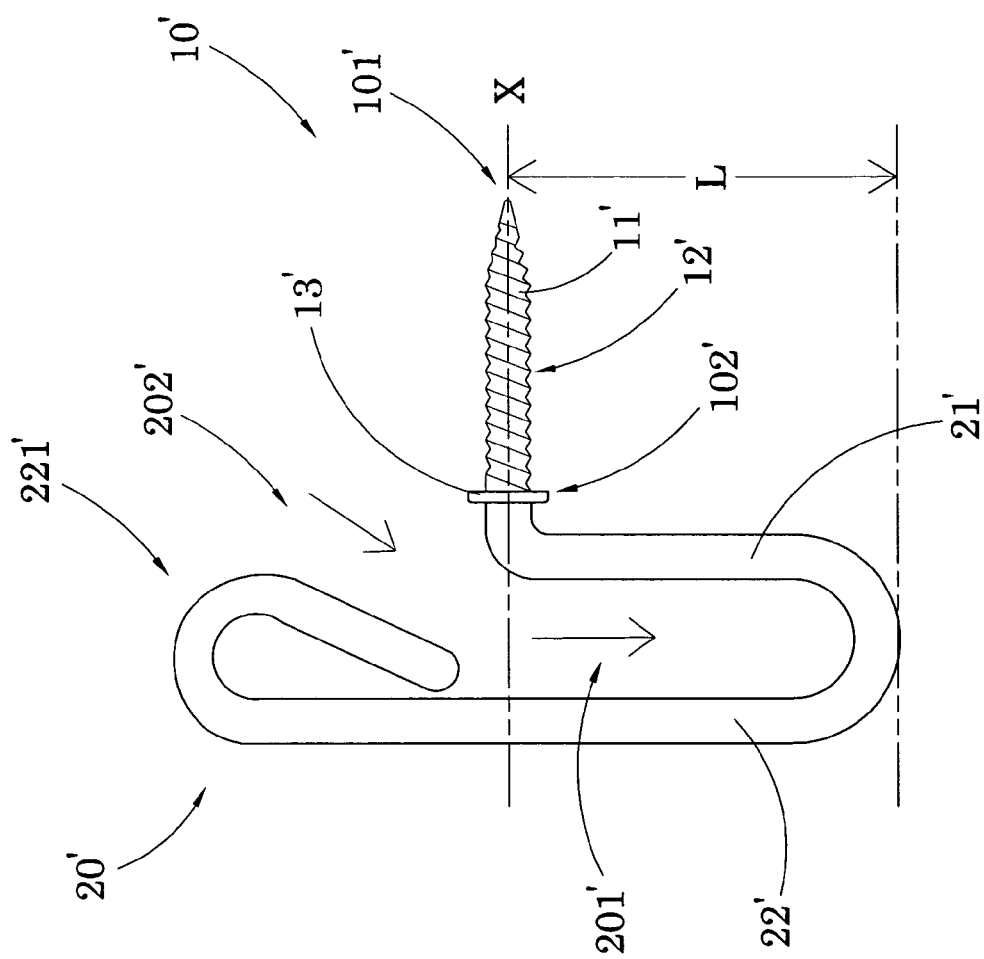
FIG. 3 is side view of a wall hook according to the above second preferred embodiment of the present invention.
Figure 4:
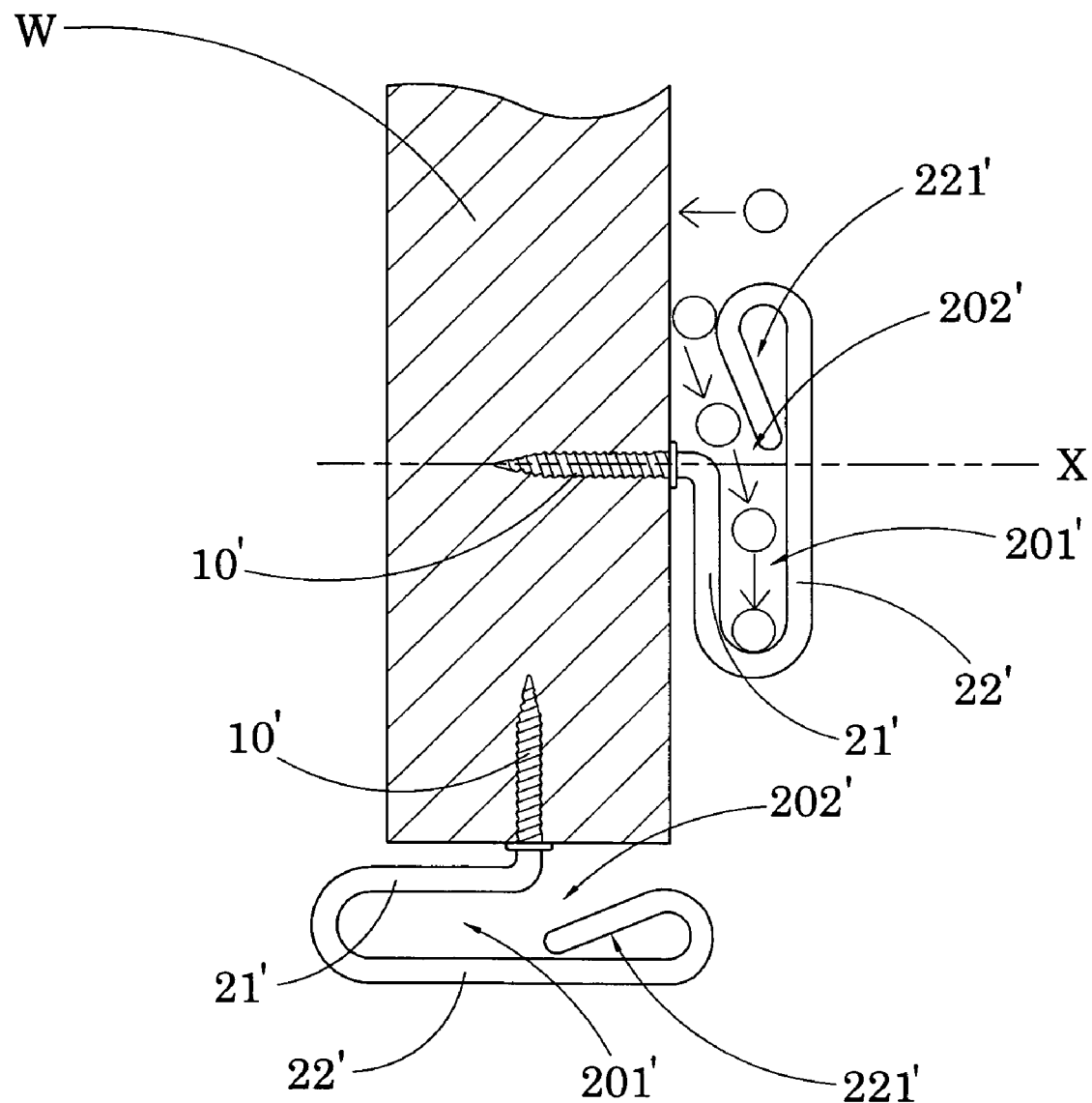
FIG. 4 illustrates the wall hook affixing to the beam at different orientations according to the above preferred second embodiment of the present invention.

As shown in FIGS. 3 and 4, a wall hook of a second embodiment illustrates an alternative mode of the first embodiment of the present invention, wherein the wall hook of a second embodiment, which is especially used for holding the cable on the wood wall W, comprises an inserting head 10' and a levering handle 20'.

As shown in FIG. 3, the inserting head 10', which defines a rotational axis X, has a front penetrating tip 101' adapted for rotatably inserting into a wall surface of the wall W and a rear fulcrum end 102' rearwardly extended from the penetrating tip 101' along the rotational axis X.

The inserting head 10' comprises an elongated inserting body 11' having a predetermined length for inserting into the wall W, and has a spiral thread 12' provided on an outer circumferential surface of the inserting body 11', wherein the spiral thread 12' is extended from the penetrating tip 101' to the fulcrum end 102' for the inserting head 10 rotatably penetrating into the wall W. The inserting head 10' further comprises a wall stopper 13' integrally and outwardly protruded at the fulcrum end 102' and arranged in such a manner that the inserting head 10' is adapted for rotatably penetrating into the wall W until the wall stopper 13' is biased against the wall surface.

The levering handle 20' comprises a transverse arm 21' integrally and transversely extended from the fulcrum end 102' of the inserting head 10' to substantially prolong a torque distance L along the transverse arm 21' with respect to the rotational axis X, and a controlling arm 22' integrally extended from the transverse arm 21' in such a manner that when the levering handle 20' is rotated, the inserting head 10' is driven to rotate for rotatably penetrating into the wall W so as to minimize a torque required to directly apply at the inserting head 10'.

As shown in FIG. 3, the transverse arm 21' is integrally extended from the fulcrum end 102' of the inserting head 10' at 90°. In other words, the transverse arm 21' is integrally extended from the inserting head 10' at a right angle to form a L-shaped structure. It is worth to mention that the torque distance L is defined as the distance between the inserting head 10' and the controlling arm 22'. Therefore, when the transverse arm 21' is extended from the inserting head 10' at a right angle, the torque distance L is defined as the length of the transverse arm 21'. In other words, when the transverse arm 21' is perpendicularly extended from the inserting head 10', the torque distance L of the wall hook of the present invention can be maximized.

According to the second embodiment, the controlling arm 22' is integrally extended from the transverse arm 21' and is bent 180° to extend parallelly to the transverse arm 21' via an angled cornering to form a U-shaped structure such that when the levering handle 20' is rotated with respect to the rotational axis X, the inserting head 10' is driven to rotate through the transverse arm 21'. As it is mentioned in the first embodiment, the controlling arm 22 of the first embodiment is bent 90° to perpendicularly extend from the transverse arm 21. Regarding to the second embodiment, the controlling arm 22' of the second embodiment is bent 180° to parallelly extend from the transverse arm 21'. In other words, both the transverse arm 21' and the controlling arm 22' are positioned perpendicularly to the inserting head 10'. Accordingly, the angled cornering has a U-shaped as a conjunction between the transverse arm 21' and the controlling arm 22'.

A length of the controlling arm 22' is longer than a length of the transverse arm 21' to form a cable cavity 201' between the controlling arm 22' and the transverse arm 21' and an opening 202' between a free end portion of the controlling arm 22' and the fulcrum end 102' of the inserting head 10' to communicate with the cable cavity 201', such that the cable is adapted for being received within the cable cavity 201' through the opening 202'. In other words, the controlling arm 22' not only forms a hand crank to drive the inserting head 10' to rotatably insert into the wall W but also provides a cable holder to hold the cable on the wall W in position.

Accordingly, a distance between the opening 202' and the wall surface is shorter than a distance between a center portion of the cable cavity 201' and the wall surface. Therefore, the cable must be intentionally fitted in the cable cavity 201' through the opening 202'. As shown in FIG. 3, when the inserting head 10' is fully inserted into the wall W that the wall stopper 13' is biased against the wall surface, the cable must be firstly moved towards the wall surface to align with the opening 202'. Then, the cable can be guided to slide into the cable cavity 201' through the opening 202' by moving the cable away from the wall surface. Therefore, the user requires two opposite movements of the cable to retain the cable within the cable cavity 201'.

As shown in FIGS. 3 and 4, a free end portion of the controlling arm 22' is bent in a loop structure to form a rounded obstructing end 221' for minimizing a width of the opening 202', wherein the free end portion of the controlling arm 22' is bent at a slant manner to form a loop at the opening 202' for guiding the cable in the cable cavity 201' at a slanted direction. As it is mentioned above, the cable must be pushed towards the wall surface to align with the opening 202' and pulled away from the wall surface to receive the cable in the cable cavity 201'. The obstructing end 221' of the controlling arms 22' forms a slanted channel to communicate the cable cavity 201' with the opening 202'. Therefore, after the cable is pushed towards the wall surface to align with the opening 202', the cable must be pulled away from the wall surface and inclinedly slid along the obstructing end 221' of the controlling arms 22' to receive in the cable cavity to 201', as shown in FIG. 4. The user requires performing the sequent movements of the cable in order to intentionally couple the cable with the levering handle 20'. However, such sequent movements of the cable are relatively simple for everyone to complete. Thus, the structural configuration of the levering handle 20' prevents the cable from being unintentionally detached from the wall hook of the present invention.

Regarding to the first and second embodiments, the wall hook of the present invention is adapted to mount at the wall or the like such as a wood beam. Having the torque distance L, the wall hook can be easily mounted to the wall or the like by minimizing the rotational force applied by the user and can be precisely penetrate through the wall surface to form the mounting hole with the corresponding size. In addition, the user does not require any tool to mount the wall hook to the wall since the user is able to easily screw the wall hook on the wall by hand.

Figure 5:
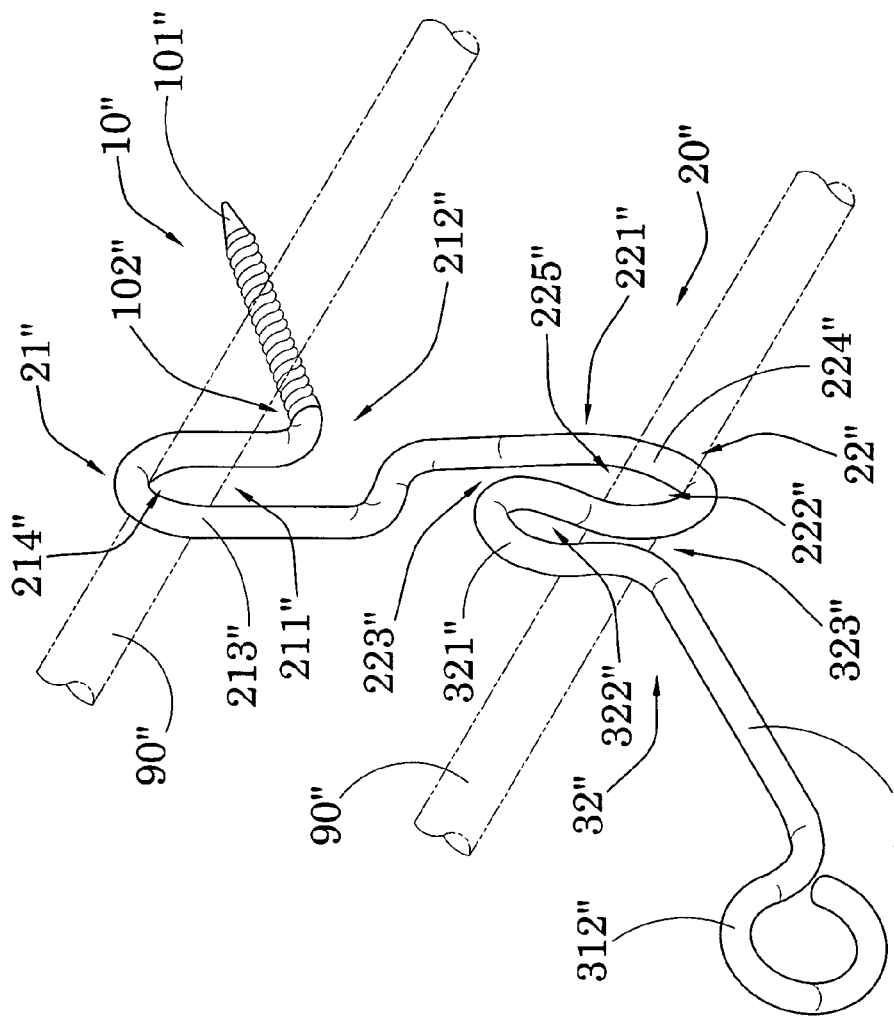
FIG. 5 is a perspective view of a wall hook according to a second preferred embodiment of the present invention.
Figure 6:
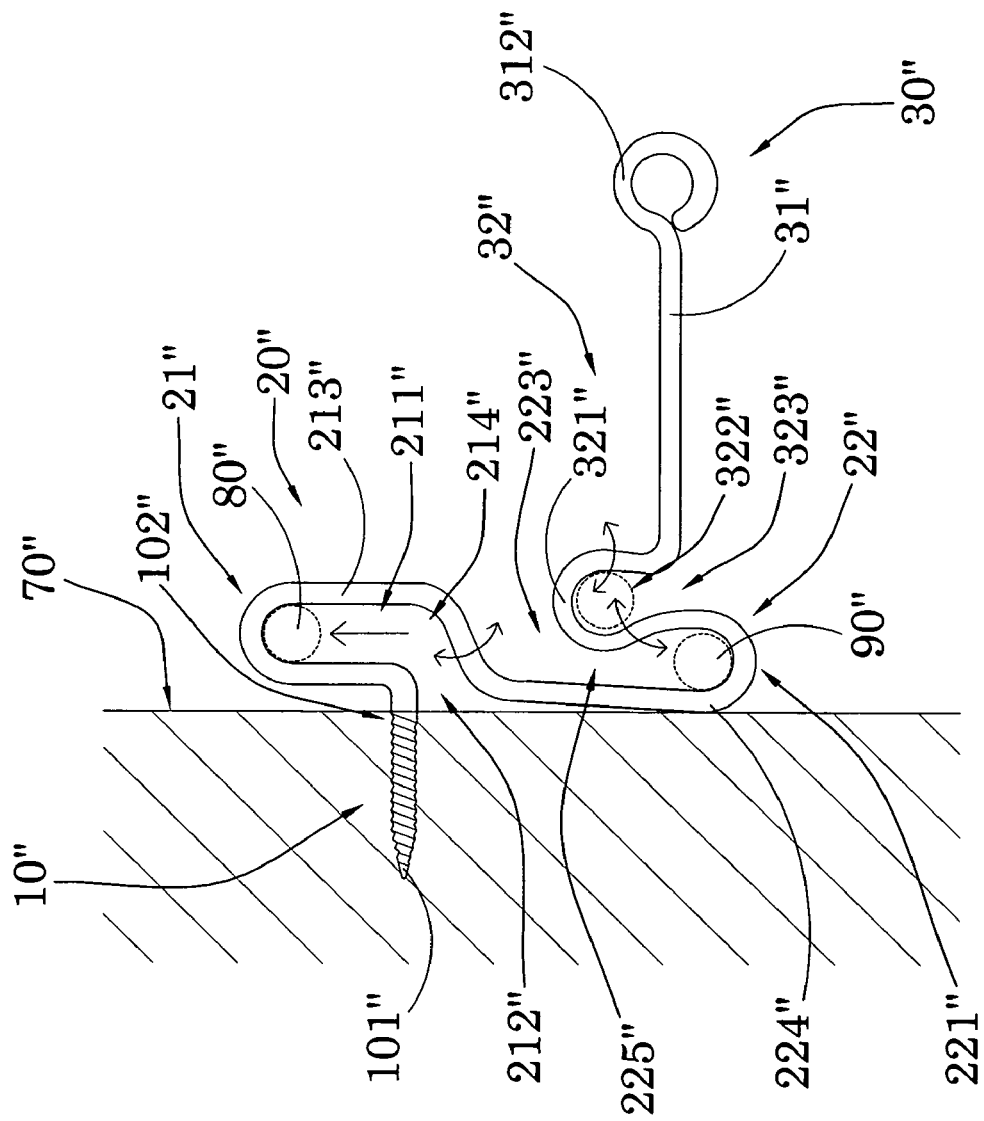
FIG. 6 is a side view of the wall hook according to the above second preferred embodiment of the present invention.
Figure 7:
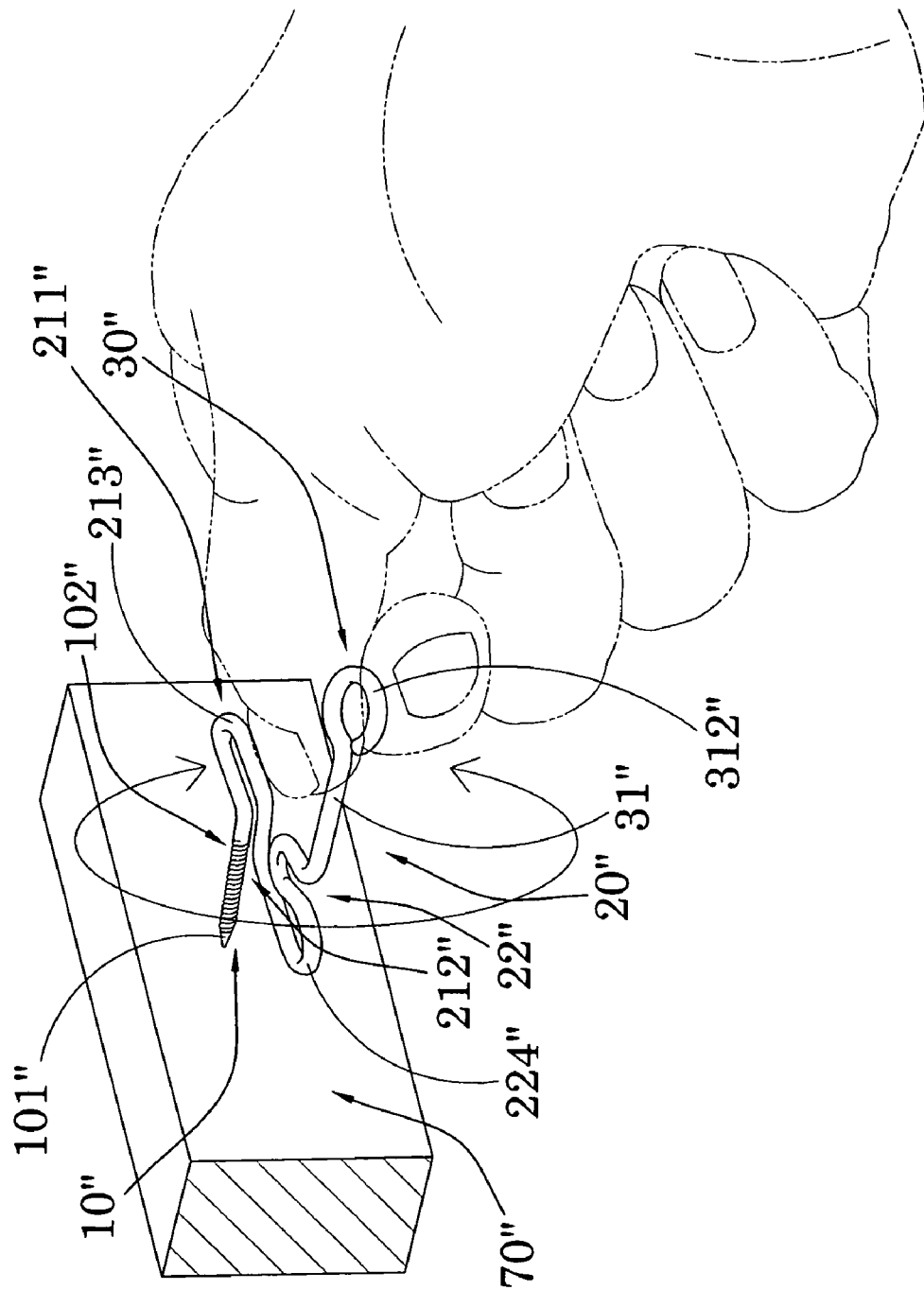
FIG. 7 is a schematic diagram of the wall hook according to the above second preferred embodiment of the present invention.

Referring to FIG. 5 to FIG. 7 of the drawings, a wall hook for mounting onto a wall surface 70", such as a drywall surface, according to a second preferred embodiment of the present invention is illustrated, in which the wall hook comprises an inserting head 10" and a levering handle 20".

The inserting head 10" has a front penetrating tip 101" for being rotatably inserted into the wall surface 70" and a rear fulcrum end 102" integrally and rearwardly extended from the penetrating tip 101".

On the other hand, the levering handle 20" comprises a cable holder 21" and a fastening enhancer 22". The cable holder 21" is transversely and integrally extended from the inserting head 10", wherein the cable holder 21" defines a receiving cavity 211" and an access opening 212" communicating with the receiving cavity 211" for allowing a user to dispose at least one cable 80" in the receiving cavity 211" via the access opening 212".

The fastening enhancer 22" is transversely and inclinedly extended with respect to the inserting head 10" in such a manner that when the inserting head 10" is rotatably inserted on the wall surface 70", the fastening enhancer 22" is arranged to be rotated as well until the fastening enhancer 22" basis against the wall surface 70" for restricting a further axial displacement of the wall hook while providing an enhanced torque applying arrangement for rotatably inserting the wall hook onto the wall surface 70".

According to the second preferred embodiment of the present invention, the inserting head 10" is elongated in shape and has a threaded portion for allowing a user to rotatably insert (i.e. hand drilling) the wall hook onto the wall.

The cable holder 21" comprises an elongated holder member 213" extended from the rear fulcrum end 102" of the inserting head 10" and bent to form a cable holding loop 214" to define the receiving cavity 211" within the loop and the access opening 212" as the opening of the loop. According to the second preferred embodiment, the cable holder 21" is upwardly extended along a transverse direction of the inserting head 10" wherein the access opening 212" is formed at a lower portion of the cable holder 21" so that a user is able to dispose a cable 80" into the receiving cavity 211" from the lower portion of the cable holder 21" via the access opening 212".

It is worth mentioning that a width of the receiving cavity 211" is designed to be slightly larger than a diameter of a predetermined cable 80", such as a typical electrical cable, such that when the cable 80" is disposed within the receiving cavity 211", its movement within the receiving cavity 211" can be kept to the minimum. Moreover, the elongated holder member 213" is bent in such a manner that a width of the receiving cavity 211" in the vicinity of the access opening 212" is gradually decreasing so that when the cable 80" is subject to gravitational force within the receiving cavity 211", the cable 80" tends to fall onto the lower portion of the cable holder 21" while retaining within the receiving cavity 211" until external force is applied to pull out the cable 80" from the receiving cavity 211". In other words, the elongated holder member 213" has a predetermined elasticity for normally holding the cable 80" within the receiving cavity 211".

It is important to mention that the access opening 212" is inclinedly provided at a bottom portion of the cable holder 21" toward the wall surface 70" so as to prevent the cable 80" from falling out of the receiving cavity 211" due to gravitational force. When the wall hook is fully inserted into the wall surface 70", the access opening 212" is also partially blocked by the wall surface 70" so that the cable 80" received in the receiving cavity 211" is securely retained therein.

The fastening enhancer 22" comprises an object holder 221" integrally extended from the cable holder 21" and defines a holder cavity 222" and a holder opening 223" communicating the holder cavity 222" with an exterior of the object holder 221". The holder cavity 222" is arranged to receive or support a wide variety of objects 90", such as wires, cables or a hanger, so as to suspendedly support the object 90" onto the wall surface 70". For example, additional wires may be received in the holder cavity 222" for electrically connecting appliances in a typical domestic environment.

According to the second preferred embodiment of the present invention, the object holder 221" comprises an elongated supporting member 224" integrally extended from the elongated holding member 213" at the access opening 212" of the cable holder 21" and is outwardly bent to form a object holding loop 225" defining the holder cavity 222" and the holder opening 223". The inner side edge of the object holding loop 225" is inclined toward the wall surface 70" so as to serve a number of functions.

First, when the wall hook is being rotatably inserted into the wall surface 70", a horizontal distance between the lower portion of the object holding loop 225" (i.e. the lower portion of the object holder 221") is gradually decreasing, and when the lower portion of the object holding loop 225" hits the wall surface 70", the wall hook is substantially prevented from rotatably inserting into the wall surface 70". Since the holder cavity 222" is arranged to receive objects 90", when the object holding loop 225" is subject to external loading, simple physics dictates that frictional force between the holding loop 225" and the wall surface 70" helps in supporting the objects 90" on the wall hook.

Second, when the wall hook is being rotatably inserted into the wall surface 70", the inclination of the holding loop 225" will only touch the wall surface 70" in a tangential manner so as to minimize a resistance of inserting the wall hook onto the wall surface 70". This can not be done when the holding loop 225" is in a vertical orientation with respective to the ground surface (i.e. substantially parallel to the wall surface 70").

Third, the fastening enhancer 22" is downwardly extended from the cable holder 21" so that an overall length of the fastening enhancer 22" and the cable holder 21" allows a user to grip on the two components so as to conveniently exert a torque for rotatably inserting the inserting head 10" onto the wall surface 70".

It is worth mentioning that the holder opening 223" of the enhancer 22" is outwardly inclined with respect to the wall surface 70" so that a user is able to dispose a predetermined of object 90", such as additional wires, into the holder cavity 222" via the holder opening 223". Accordingly, a width of the holder cavity 222" in the vicinity of the holder opening 223" is gradually decreasing so as to prevent the object 90" disposed in the holder cavity 222" from being accidentally going out when the wall hook is in use.

The wall hook further comprises a hanger arrangement 30" extended from the fastening enhancer 22" of the levering handle 20" for allowing a predetermined accessory 100" to hang on the hanger arrangement 30". More specifically, the hanger arrangement 30" comprises a hanger member 31" integrally extended from the fastening enhancer 22" of the levering handle 20" wherein the accessory 100" is arranged to suspendedly hang onto the hanger member 31" for being suspendedly hung onto the wall surface 70". As such, the user is able to attach hangers as accessory 100" for clothes, onto the wall surface 70" by using the wall hook of the present invention. In other words, the wall hook of the present invention is capable of attaching a number of tangible things onto the wall surface 70", such as the cables 80", objects 90" and the accessory 100" as described above.

In order to reinforce the supporting strength of the wall hook, the hanger arrangement 30" further comprises a load distributor 32" extended between the fastening enhancer 22" and the hanger member 31" so as to allow load exerted onto the wall hooks to be evenly disturbed along the entire body of the wall hook and prevent substantial stress concentration on any point of the wall hook of the present invention.

According to the second preferred embodiment of the present invention, the load distributor 32" comprises a stress distributing member 321" extended from the elongated supporting member 224" and the hanger member 31", and bent to form a curved cross section which defines a distributor cavity 322" and a distributor opening 323" communicating the distributor cavity 322" and an exterior of the load distributor 32", wherein the curved stress disturbing member 321" is arranged to spread stress concentration at the load distributor 32" so as to prevent the intersection between the hanger arrangement 30" and the levering handle 20" from being structurally deformed or damaged.

Furthermore, the load distributor 32" has a predetermined elasticity so as to allow movement tolerance between the hander member 31" and the fastening enhancer 22". A user may also allow some objects to pass through the distributor cavity 322". According to the second preferred embodiment of the present invention, the distributor opening 323" faces at a downward orientation with respect to the wall hook.

It is important to emphasis that the hanger member 31" may be embodied as having a variety of shapes and functions. For example, the hanger member 31" may be embodied as an elongated member extending from the fastening enhancer 22" so as to allow hangers or picture frames etc. to be suspendedly hung thereon. Furthermore, instead of an elongated member, the hanger member 31" can also be bent to form at least one indention 311" for preventing the object hung thereon to accidentally slide along the elongated member. Since the hanger member 31" is at a distance from the inserting head 10", it can also provides a handle for the user to grip thereon so as to enhance a torque for rotatably inserting the inserting head onto the wall surface 70". Moreover, a hanging station 312" can be formed at the rear end portion of the hanger member 31" for allowing the user to hang some other objects on the hanging station 312"

Figure 8:
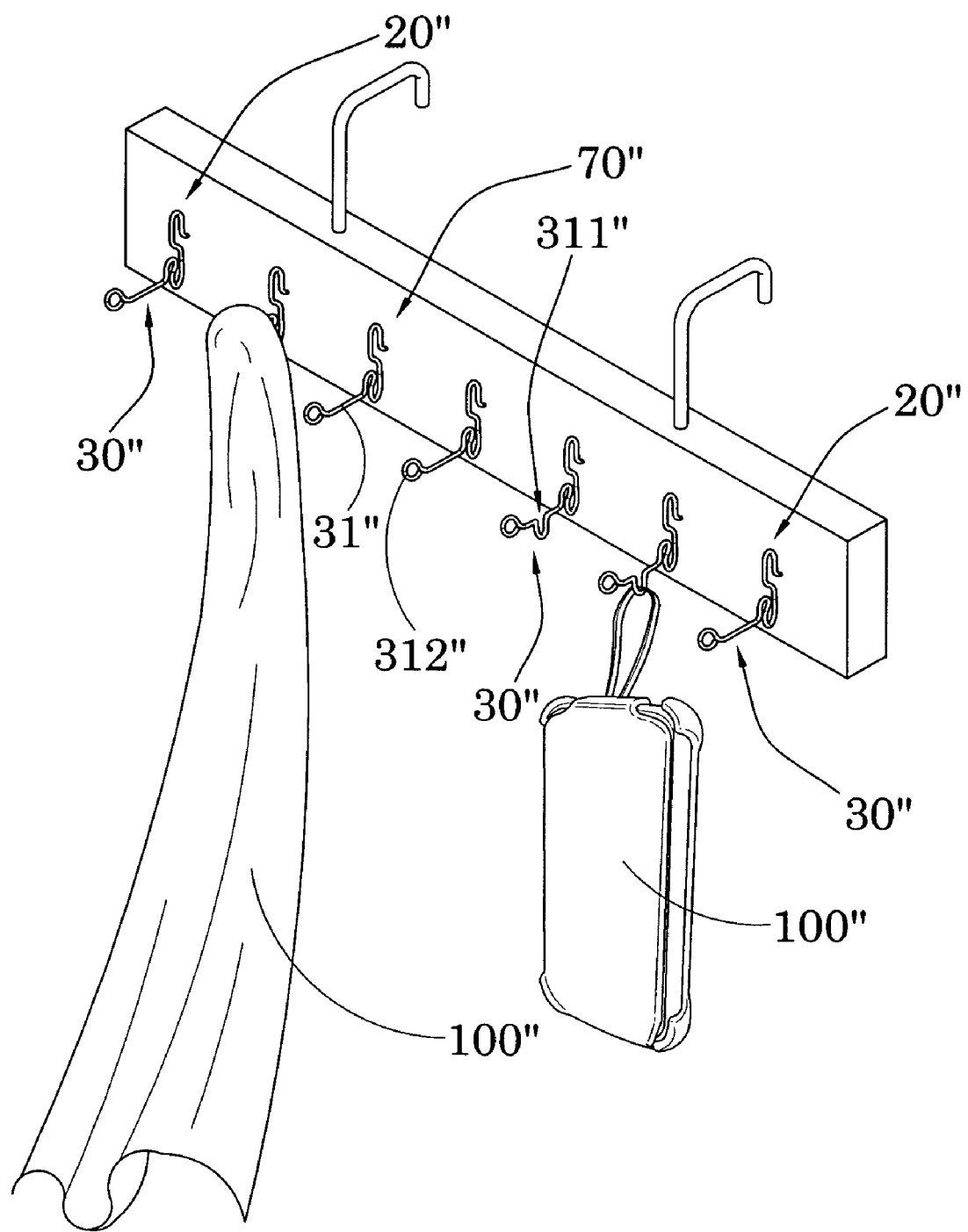
FIG. 8 is an alternative mode of operation of the wall hook according to the above second preferred embodiment of the present invention.

In order to enhance the applications of the present invention, as shown in FIG. 8 of the drawings, an alternative mode of operation of the wall hook is illustrated. A plurality of wall hooks may be attached onto a supporting member, such as a wooden board, which is then suspendedly supported onto a fixture, such as a door, so that a user is able to simultaneously suspendedly hang a number of objects onto the supporting member by means of the wall hook of the present invention.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A wall hook for mounting on a wall surface, comprising: an inserting head having a front penetrating tip for being rotatably inserted into a wall surface and a rear fulcrum end integrally and rearwardly extended from said penetrating tip; and a levering handle which comprises: a cable holder transversely and integrally extended from said inserting head, wherein said cable holder defines a receiving cavity and an access opening communicating with said receiving cavity for allowing a user to dispose at least one cable in said receiving cavity via said access opening; and a fastening enhancer transversely and inclinedly extended with respect to said inserting head in such a manner that when said inserting head is rotatably inserted on said wall surface, said fastening enhancer is arranged to be rotated as well until said fastening enhancer basis against said wall surface for restricting a further axial displacement of said wall hook while providing an enhanced torque applying arrangement for rotatably inserting said wall hook onto said wall surface;

wherein said cable holder comprises an elongated holder member extended from said inserting head and bent to form a cable holding loop to define said receiving cavity within said loop and said access opening, wherein said cable holder is upwardly extended along a transverse direction of said inserting head so that a user is able to dispose said cable into said receiving cavity via said access opening;

wherein a width of said receiving cavity is designed to be slightly larger than a diameter of said predetermined cable such that when said cable is disposed within said receiving cavity, a movement of said cable within said receiving cavity is kept to the minimum;

wherein said elongated holder member is bent in such a manner that a width of said receiving cavity in a vicinity of said access opening is gradually decreasing so that when said cable is subject to gravitational force within said receiving cavity, said cable tends to fall onto said lower portion of said cable holder while retaining within said receiving cavity until external force is applied to pull out said cable from said receiving cavity.

2. The wall hook, as recited in claim 1, wherein said access opening is inclinedly provided at a bottom portion of said cable holder toward said wall surface so as to prevent said cable from falling out of said receiving cavity due to gravitational force.

3. The wall hook, as recited in claim 2, wherein said fastening enhancer comprises an object holder integrally extended from said cable holder and defines a holder cavity and a holder opening communicating said holder cavity with an exterior of said object holder, wherein said holder cavity is arranged to receive an object therein.

4. The wall hook, as recited in claim 3, wherein said object holder comprises an elongated supporting member integrally extended from said elongated holding member at said access opening of said cable holder and is outwardly bent to form a object holding loop defining said holder cavity and said holder opening, wherein said inner side edge of said object holding loop is inclined toward said wall surface so as allow convenient rotation of said inserting head with the minimum frictional force exerted to said wall hook from said wall surface.

5. The wall hook, as recited in claim 4, wherein said holder opening of said enhancer is outwardly inclined with respect to said wall surface so that a user is able to dispose said object into said holder cavity via said holder opening from a corresponding orientation.

6. The wall hook, as recited in claim 5, wherein a width of said holder cavity in said vicinity of said holder opening is gradually decreasing so as to prevent said object disposed in said holder cavity from being accidentally dropping out.

7. The wall hook, as recited in claim 6, further comprising a hanger arrangement extended from said fastening enhancer of said levering handle for allowing a predetermined accessory to hang on said hanger arrangement.

8. The wall hook, as recited in claim 7, wherein said hanger arrangement comprises a hanger member integrally extended from said fastening enhancer of said levering handle wherein said accessory is arranged to suspendedly hang onto said hanger member for being suspendedly hung onto said wall surface.

9. The wall hook, as recited in claim 8, wherein said hanger arrangement further comprises a load distributor extended between said fastening enhancer and said hanger member so as to allow loading exerted onto said wall hooks to be evenly disturbed along said entire body of said wall hook and prevent substantial stress concentration on any single point of said wall hook.

10. The wall hook, as recited in claim 9, wherein said load distributor comprises a stress distributing member extended from said elongated supporting member and said hanger member, and bent to form a curved cross section which defines a distributor cavity and a distributor opening communicating said distributor cavity and an exterior of said load distributor, wherein said curved stress disturbing member is arranged to spread stress concentration at said load distributor so as to prevent said intersection between said hanger arrangement and said levering handle from being structurally deformed.

11. The wall hook, as recited in claim 10, wherein said load distributor has a predetermined elasticity so as to allow movement tolerance between said hander member and said fastening enhancer.

12. The wall hook, as recited in claim 11, wherein said hanger member is bent to form at least one indention for preventing said object hung thereon from accidentally sliding along said elongated member.

13. A wall hook for mounting on a wall surface, comprising: an inserting head having a front penetrating tip for being rotatably inserted into a wall surface and a rear fulcrum end integrally and rearwardly extended from said penetrating tip; and a levering handle which comprises: a fastening enhancer transversely and inclinedly extended with respect to said inserting head in such a manner that when said inserting head is rotatably inserted on said wall surface, said fastening enhancer is arranged to be rotated as well until said fastening enhancer basis against said wall surface for restricting a further axial displacement of said wall hook while providing an enhanced torque applying arrangement for rotatably inserting said wall hook onto said wall surface; and a hanger member integrally extended from said fastening enhancer of said levering handle wherein said predetermined object is arranged to suspendedly hang onto said hanger member for being suspendedly hung onto said wall surface.

14. The wall hook, as recited in claim 13, wherein said fastening enhancer comprises an object holder integrally extended from said cable holder and defines a holder cavity and a holder opening communicating said holder cavity with an exterior of said object holder, wherein said holder cavity is arranged to receive an object therein.

15. The wall hook, as recited in claim 14, wherein said object holder comprises an elongated supporting member integrally extended from said elongated holding member at said access opening of said cable holder and is outwardly bent to form a object holding loop defining said holder cavity and said holder opening, wherein said inner side edge of said object holding loop is inclined toward said wall surface so as allow convenient rotation of said inserting head with the minimum frictional force exerted to said wall hook from said wall surface.

16. The wall hook, as recited in claim 15, wherein said holder opening of said enhancer is outwardly inclined with respect to said wall surface so that a user is able to dispose said object into said holder cavity via said holder opening from a corresponding orientation.

17. The wall hook, as recited in claim 16, wherein a width of said holder cavity in said vicinity of said holder opening is gradually decreasing so as to prevent said object disposed in said holder cavity from being accidentally dropping out.

18. The wall hook, as recited in claim 17, wherein said hanger arrangement comprises a hanger member integrally extended from said fastening enhancer of said levering handle wherein said accessory is arranged to suspendedly hang onto said hanger member for being suspendedly hung onto said wall surface.

19. The wall hook, as recited in claim 18, wherein said hanger arrangement further comprises a load distributor extended between said fastening enhancer and said hanger member so as to allow loading exerted onto said wall hooks to be evenly disturbed along said entire body of said wall hook and prevent substantial stress concentration on any single point of said wall hook.

20. The wall hook, as recited in claim 19, wherein said load distributor comprises a stress distributing member extended from said elongated supporting member and said hanger member, and bent to form a curved cross section which defines a distributor cavity and a distributor opening communicating said distributor cavity and an exterior of said load distributor, wherein said curved stress disturbing member is arranged to spread stress concentration at said load distributor so as to prevent said intersection between said hanger arrangement and said levering handle from being structurally deformed.

21. The wall hook, as recited in claim 20, wherein said load distributor has a predetermined elasticity so as to allow movement tolerance between said hander member and said fastening enhancer.

22. The wall hook, as recited in claim 21, wherein said hanger member is bent to form at least one indention for preventing said object hung thereon from accidentally sliding along said elongated member.

* * * * *